United States Patent
Sakashita et al.

(10) Patent No.: US 8,802,243 B2
(45) Date of Patent: Aug. 12, 2014

(54) ALUMINUM ALLOY CLAD MEMBER ADOPTED TO HEAT EXCHANGER, AND CORE MATERIAL FOR THE SAME

(75) Inventors: Shinji Sakashita, Kobe (JP); Takahiro Ozawa, Kobe (JP); Satoshi Yoshida, Kobe (JP)

(73) Assignee: Kabushiki Kaisha Kobe Seiko Sho (Kobe Steel, Ltd.), Kobe-shi (JP)

( * ) Notice: Subject to any disclaimer, the term of this patent is extended or adjusted under 35 U.S.C. 154(b) by 207 days.

(21) Appl. No.: 12/984,079

(22) Filed: Jan. 4, 2011

(65) Prior Publication Data

US 2011/0192583 A1 Aug. 11, 2011

(30) Foreign Application Priority Data

Feb. 8, 2010 (JP) ................................. 2010-025634

(51) Int. Cl.
| | |
|---|---|
| B32B 15/20 | (2006.01) |
| F28F 21/08 | (2006.01) |
| B23K 35/28 | (2006.01) |
| C22C 21/02 | (2006.01) |
| C22C 21/12 | (2006.01) |
| C22C 21/00 | (2006.01) |
| B32B 15/01 | (2006.01) |
| B23K 1/00 | (2006.01) |
| C22C 21/04 | (2006.01) |

(52) U.S. Cl.
CPC ............. *F28F 21/084* (2013.01); *F28F 21/089* (2013.01); *B32B 15/016* (2013.01); *B23K 1/0012* (2013.01); *B23K 35/286* (2013.01); *C22C 21/04* (2013.01); *C22C 21/12* (2013.01); *C22C 31/16* (2013.01); *Y10S 165/905* (2013.01)
USPC ........................................... 428/654; 165/905

(58) Field of Classification Search
None
See application file for complete search history.

(56) References Cited

U.S. PATENT DOCUMENTS

| 4,203,490 | A | * | 5/1980 | Terai et al. ................. 165/134.1 |
|---|---|---|---|---|
| 4,244,756 | A | * | 1/1981 | Tanabe et al. ................. 428/544 |
| 5,240,519 | A | * | 8/1993 | Kamio et al. ................. 148/415 |
| 5,460,666 | A | * | 10/1995 | Fujita et al. ................. 148/693 |
| 5,460,895 | A | * | 10/1995 | Rungta et al. ................. 428/654 |
| 7,824,607 | B2 | * | 11/2010 | Kajihara et al. ................. 420/532 |
| 2006/0166030 | A1 | * | 7/2006 | Suzuki et al. ................. 428/654 |
| 2007/0246509 | A1 | * | 10/2007 | Koshigoe et al. ............. 228/101 |
| 2008/0175747 | A1 | * | 7/2008 | Kajihara et al. ............. 420/532 |
| 2009/0078398 | A1 | * | 3/2009 | Ueda et al. ................. 165/151 |
| 2010/0183897 | A1 | * | 7/2010 | Kobayashi et al. ........... 428/654 |
| 2011/0027610 | A1 | | 2/2011 | Tatsumi et al. |
| 2012/0231293 | A1 | * | 9/2012 | Kobayashi et al. ........... 428/654 |

FOREIGN PATENT DOCUMENTS

| CN | 1094675 | A | | 11/1994 |
|---|---|---|---|---|
| CN | 101225491 | A | | 7/2008 |
| CN | 101578382 | A | | 11/2009 |
| JP | 10-280076 | A | | 10/1998 |
| JP | 11-172357 | A | | 6/1999 |
| JP | 2003-293062 | A | | 10/2003 |
| JP | 2004-35966 | | * | 2/2004 |
| JP | 2004-035966 | A | | 2/2004 |
| JP | 2007-327094 | A | | 12/2007 |
| JP | 2008-231555 | | | 10/2008 |
| JP | 2008-284558 | A | | 11/2008 |
| JP | 2009-215595 | A | | 9/2009 |
| JP | 2009-228010 | | | 10/2009 |

OTHER PUBLICATIONS

Machine translation of JP 2008-231555. Oct. 2008.*
Machine translation of JP 2009-228010. Oct. 2009.*
Machine translation of JP 2004-035966. Feb. 2004.*
Office Action issued Jul. 2, 2012, in Chinese Patent Application No. 201110035029.X with English-language translation.
Combined Office Action and Search Report issued Oct. 8, 2013 in Chinese Patent Application No. 201110035029.X (with English language translation).

* cited by examiner

Primary Examiner — John J Zimmerman

(74) Attorney, Agent, or Firm — Oblon, Spivak, McClelland, Maier & Neustadt, L.L.P.

(57) ABSTRACT

A core material for an aluminum alloy clad material contains Si in a content of 0.3% to 1.5% (hereinafter "%" means "percent by mass"), Mn in a content of 0.3% to 2.0%, Cu in a content of 0.3% to 1.5%, Ti in a content of 0.01% to 0.5%, and B in a content of 0.001% to 0.1%, with the remainder including Al and inevitable impurities. The core material and an aluminum alloy clad material using the same ensure sufficient corrosion resistance and give a product having an extended life.

6 Claims, No Drawings

ALUMINUM ALLOY CLAD MEMBER ADOPTED TO HEAT EXCHANGER, AND CORE MATERIAL FOR THE SAME

TECHNICAL FIELD

The present invention relates to an aluminum alloy clad material which is highly resistant to corrosion and is adopted to a heat exchanger.

BACKGROUND ART

Heat exchangers such as radiators, condensers, and evaporators to be mounted in automobiles are generally manufactured by forming, assembling, and brazing aluminum alloy sheets, which are lightweight and excel in heat conductivity. Most of aluminum alloy core materials for use in such heat exchangers adopt Al—Mn alloys having relatively high strengths. In addition, recently developed core materials further contain alloy elements such as Cu, Si, and Mg so as to have further higher strengths.

When such an aluminum alloy material for heat exchangers is used as a tube typically in a radiator, the outer surface of the tube is exposed to the atmosphere (air), and the inner surface is exposed to a coolant such as cooling water. The tube, when exposed to such a corrosive environment, may suffer from corrosion (pitting corrosion) proceeding locally, resulting in the generation of through holes (penetrating holes). For preventing corrosion of the outer surface of the tube, so-called "sacrificial protection" is generally employed and effective, in which a fin material typically containing an Al—Zn alloy or another substance having a less-noble potential than that of the aluminum alloy constituting the tube is brought in contact with the tube. Also for preventing corrosion of the inner surface of the tube, the sacrificial protection technique is often employed. Specifically, in this case, the tube is generally formed from a clad material including an aluminum alloy core material, and clad on the inner side of the core material, a sacrificial anode material (hereinafter also referred to as a "sacrificial material") of an Al—Zn alloy having a less-noble potential than that of the aluminum alloy of the core material. The outer surface of the tube is often clad with an Al—Si alloy or another brazing material having a low melting point, for the purpose of brazing typically with the fin material.

As is described above, clad materials including three or more layers and having a core material (core layer), and clad thereon, a sacrificial material (sacrificial layer) and a brazing material (brazing layer) are often used as aluminum alloy materials for heat exchangers.

Increasing demands have been made on such aluminum alloys for heat exchangers to have longer lives and smaller thicknesses (lighter weights) and to have further higher corrosion resistance. Exemplary techniques for further improving the corrosion resistance of aluminum alloys for heat exchangers include those disclosed in Japanese Unexamined Patent Application Publication (JP-A) No. 2009-228010 and Japanese Unexamined Patent Application Publication (JP-A) No. 2008-231555. JP-A No. 2009-228010 discloses an aluminum alloy brazing sheet in which compositions of the core material and cladding are controlled. JP-A No. 2008-231555 discloses an aluminum alloy composite material in which the composition of the core material is controlled, and the distribution of Al—Mn intermetallic compounds is also controlled.

SUMMARY OF INVENTION

Technical Problem

Although the outer surface of a heat exchanger can relatively easily have corrosion resistance due to the sacrificial protection effect of the fin material, the inner surface thereof often suffers from the generation of through holes caused by pitting corrosion and shows insufficient corrosion resistance, unless a sacrificial layer having a sacrificial protection effect is clad. The techniques disclosed in above-mentioned JP-A No. 2009-228010 and JP-A No. 2008-231555 ensure corrosion resistance to some extent by the action of the cladding or the intermetallic compounds. However, if the cladding or the intermetallic compounds are corroded or damaged, the core material is exposed, and the exposed core material can be corroded thereafter. Under such circumstances, the present inventors came to consider that the core material itself should have higher corrosion resistance in order to allow the heat exchanger to have a further extended life.

Accordingly, an object of the present invention is to provide a core material for an aluminum alloy clad material, and an aluminum alloy clad material using the core material, both of which ensure sufficient corrosion resistance to allow a heat exchanger to have a further extended life.

The present invention achieves the object and provides, in an embodiment, a core material for an aluminum alloy clad material, which core material contains Si in a content of 0.3 to 1.5 percent by mass; Mn in a content of 0.3 to 2.0 percent by mass; Cu in a content of 0.3 to 1.5 percent by mass; Ti in a content of 0.01 to 0.5 percent by mass; and B in a content of 0.001 to 0.1 percent by mass, with the remainder including Al and inevitable impurities. This core material excels in corrosion resistance.

The core material may further contain (a) Mg in a content of 1.0 percent by mass or less (excluding 0%) and/or Ca in a content of 1.0 percent by mass or less (excluding 0%); and/or (b) at least one element selected from the group consisting of Ni in a content of 0.5 percent by mass or less (excluding 0%), Cr in a content of 0.5 percent by mass or less (excluding 0%), Nb in a content of 0.5 percent by mass or less (excluding 0%), V in a content of 0.5 percent by mass or less (excluding 0%), and Zr in a content of 0.5 percent by mass or less (excluding 0%).

The present invention also provides, in another embodiment, an aluminum alloy clad material which includes a layer of the core material; and a filler material layer clad on one or both sides of the core material layer, in which the filler material contains an Al—Si alloy, a Zn alloy, or a Sn alloy. The present invention further provides, in still another embodiment, an aluminum alloy clad material which includes a layer of the core material; a filler material layer clad on one side of the core material layer; and a sacrificial material layer clad on the other side of the core material layer, in which the filler material contains an Al—Si alloy, a Zn alloy, or a Sn alloy, and the sacrificial material contains an Al—Zn alloy.

The present invention further provides an automobile brazed radiator tube using the aluminum alloy clad material. In a preferred embodiment, the aluminum alloy clad material is adopted to an automobile heat exchanger.

Advantageous Effects of Invention

The core material for an aluminum alloy clad material according to the present invention contains Cu and Ti in combination with an appropriate amount of boron (B), thereby exhibits excellent corrosion resistance, and allows the heat exchanger to have a longer life. In addition, the core material for an aluminum alloy clad material according to the present invention can exhibit excellent corrosion resistance even when the resulting clad material has no sacrificial layer, and, when used typically in an automobile heat exchanger tube, allows the tube to have a smaller thickness and thereby allows the heat exchanger to have both a lighter weight and a longer life.

DESCRIPTION OF EMBODIMENTS

The present inventors have made intensive investigations on aluminum alloy materials (aluminum alloy members) for heat exchangers which ensure sufficient corrosion resistance and thereby allow extended lives of the heat exchangers. Such aluminum alloy members for heat exchangers have very small thicknesses of about 0.3 mm and should be protected from pitting caused by pitting corrosion. In known corrosion protection techniques using a sacrificial material, pitting corrosion is prevented by the sacrificial protection of the sacrificial material composed of an Al—Zn alloy, because the Al—Zn alloy has a less-noble potential than that of the aluminum alloy constituting the core material. Specifically, the known corrosion protection techniques prevent or inhibit the generation of pitting corrosion by allowing the entire material to have a less noble potential by the presence of the sacrificial material having a less-noble potential, so as not to exceed the pitting corrosion potential of the core material. The pitting corrosion potential is a critical potential over which pitting corrosion is generated.

In contrast to this, the present inventors have conceived that the pitting corrosion can be prevented by allowing the core material itself to have a higher pitting corrosion potential (to have a more-noble potential), even when the sacrificial material does not exhibit its sacrificial protection effect due to the corrosion or damage of the sacrificial material or even when a sacrificial material layer is not provided. For increasing the pitting corrosion potential of the core material itself, it is very effective to add Cu and Ti in combination in appropriate amounts. It should be noted that the use of Cu alone may possibly impair the corrosion resistance of the aluminum alloy, because Cu has an adverse effect of significantly accelerating a cathodic reaction of corrosion, although it has an effect of increasing the pitting corrosion potential of the aluminum alloy. To solve the adverse effect of Cu, the present inventors have found that the addition of boron (B) in an appropriate amount in combination with Cu can cancel the cathodic reaction acceleration effect of Cu, namely, can increase the pitting corrosion potential without loss of the corrosion resistance.

The core material for an aluminum alloy clad material according to the present invention should have an optimized composition so as to have satisfactory properties such as corrosion resistance, as well as strength and brazing ability necessary as a member such as a heat exchanger tube. The reasons for adding component elements and amounts thereof for use in the core material for an aluminum alloy clad material according to the present invention will be described below. All percentages herein are by mass, unless otherwise specified.

Si in a content of 0.3% to 1.5%

Silicon (Si) element is effective to improve the strength of the aluminum alloy. Especially when added in combination with manganese (Mn), Si and Mn form a Si—Mn precipitate, and this further effectively improves the strength of the aluminum alloy. Si, if in a content of less than 0.3%, gives a less amount of dissolved Si and thereby insufficiently effectively improves the strength. In contrast, Si, if in a content of more than 1.5%, lowers the melting point of the core material, and this causes melting of the core material during brazing. For these reasons, the Si content is specified to be from 0.3% to 1.5%. The lower limit of the Si content is preferably 0.35%, more preferably 0.4%, and furthermore preferably 0.55%. The upper limit of the Si content is preferably 1.45%, more preferably 1.4%, and furthermore preferably 1.0%.

Mn in a content of 0.3% to 2.0%

Manganese (Mn) element is effective to improve the strength of the aluminum alloy, as with Si. For effectively exhibiting the activity, the Mn content is specified to be 0.3% or more. In contrast, Mn, if in an excessively large content, causes precipitation of coarse precipitates to impair workability, thus undesirable when the core material is processed typically into a heat exchanger tube. Thus, the Mn content is specified to be 2.0% or less. The lower limit of the Mn content is preferably 0.35%, more preferably 0.40%, and furthermore preferably 0.7%. The upper limit of the Mn content is preferably 1.9%, more preferably 1.8%, and furthermore preferably 1.6%.

Cu in a content of 0.3% to 1.5%

Copper (Cu) element allows the aluminum alloy to have a higher pitting corrosion potential and thereby to be resistant to pitting corrosion. In addition, Cu effectively allows the aluminum alloy to have a higher strength and is thereby necessary for a higher strength of the clad material. To effectively exhibit these activities, the Cu content is specified to be 0.3% or more. In contrast, an excessively large amount of Cu may lower the melting point of the aluminum alloy to cause the core material to melt during brazing, thus being undesirable. For this reason, the Cu content is specified to be 1.5% or less. The lower limit of the Cu content is preferably 0.35%, more preferably 0.40%, and furthermore preferably 0.50%. The upper limit of the Cu content is preferably 1.45%, more preferably 1.4%, and furthermore preferably 1.0%.

Ti in a content of 0.01% to 0.5%

Titanium (Ti) element allows the aluminum alloy to have a higher pitting corrosion potential and thereby to be resistant to pitting corrosion, as with Cu. To exhibit these activities effectively, the Ti content is specified to be 0.01% or more. In contrast, an excessively large amount of Ti has an adverse effect of impairing workability, and to avoid this, the Ti content is specified to be 0.5% or less. The lower limit of the Ti content is preferably 0.02%, more preferably 0.03%, and furthermore preferably 0.10%. The upper limit of the Ti content is preferably 0.45%, more preferably 0.4%, and furthermore preferably 0.35%.

B in a content of 0.001% to 0.1%

Boron (B) element has an activity of canceling the cathodic reaction accelerating activity of Cu and is essential for improving the corrosion resistance of the core material according to the present invention. The activity of boron is probably based on that boron undergoes corrosion and dissolution to form a borate, and this acts as an inhibitor to the cathodic reaction. To exhibit the activities effectively, the B content is specified to be 0.001% or more. In contrast, boron impairs castability (flowability) upon production of the aluminum alloy, and the B content is therefore specified to be 0.1% or less. The lower limit of the B content is preferably 0.002%, more preferably 0.003%, and furthermore preferably 0.01%. The upper limit of the B content is preferably 0.095%, more preferably 0.09%, and furthermore preferably 0.07%.

The core material for an aluminum alloy clad material according to the present invention has the basic composition as mentioned above, with the remainder including substantially aluminum. However, it is naturally acceptable that the core material contains inevitable impurities (such as Fe and Zn) brought typically from raw materials, construction materials, and manufacturing facilities. The core material for an aluminum alloy clad material according to the present invention may further contain one or more of the following elements according to necessity.

Mg in a content of 1.0% or less (excluding 0%) and/or Ca in a content of 1.0% or less (excluding 0%)

Magnesium (Mg) and calcium (Ca) elements are both effective for improving the corrosion resistance, because these elements dissolve and thereby exhibit a pH increasing activity. This prevents the pH from decreasing due to a hydrolysis reaction in a local anode where Al dissolves and thereby prevents the corrosion reaction. Among them, Mg, when coexisting with Si, forms $Mg_2Si$ and other compounds as precipitates to contribute to improvements in strength. To exhibit these activities effectively, the Mg content and Ca content are each preferably 0.01% or more. In contrast, excessively large amounts of Mg and Ca may lower the brazing ability in a brazing process a fluoride flux. For this reason, the Mg content and Ca content are each preferably 1.0% or less. The lower limits of the Mg content and Ca content are each more preferably 0.02%, furthermore preferably 0.03%, and especially preferably 0.1%. The upper limits of the Mg content and Ca content are each more preferably 0.95%, furthermore preferably 0.9%, and especially preferably 0.7%.

At least one element selected from the group consisting of Ni in a content of 0.5 percent by mass or less (excluding 0%), Cr in a content of 0.5 percent by mass or less (excluding 0%), Nb in a content of 0.5 percent by mass or less (excluding 0%), V in a content of 0.5 percent by mass or less (excluding 0%), and Zr in a content of 0.5 percent by mass or less (excluding 0%)

Nickel (Ni), chromium (Cr), niobium (Nb), vanadium (V), and zirconium (Zr) have activities of improving the corrosion resistance by strengthening a passive film formed on the surface of the aluminum alloy and thereby allowing the aluminum alloy to be resistant to pitting corrosion. These activities are developed because the respective elements are enriched as stable oxides in the surface layer of the aluminum alloy. To exhibit these activities effectively, the contents of these elements are each preferably 0.01% or more. In contrast, these elements, if present in excessively large amounts, may lower the workability, and the contents of the respective elements are each preferably 0.5% or less. The lower limits of the Ni, Cr, Nb, V, and Zr contents are each more preferably 0.02%, and furthermore preferably 0.03%. The upper limits of the Ni, Cr, Nb, V, and Zr contents are each more preferably 0.45%, furthermore preferably 0.4%, and especially preferably 0.3%.

Embodiments of the present invention further include (i) an aluminum alloy clad material including a layer of the core material and a filler material layer clad on one or both sides of the core material layer, in which the filler material contains an Al—Si alloy, a Zn alloy, or a Sn alloy; and (ii) an aluminum alloy clad material including a layer of the core material, a filler material layer clad on one side of the core material layer, and a sacrificial material layer clad on the other side of the core material layer, in which the filler material contains an Al—Si alloy, a Zn alloy, or a Sn alloy, and the sacrificial material contains an Al—Zn alloy.

Brazing Material

As used herein the term "Al—Si alloy" refers to an aluminum alloy containing Si in a content of about 5% to about 15% and may be an aluminum alloy further containing, for example, Fe, Cu, and/or Zn each in a content of about 1% or less, in addition to Si. Silicon (Si) has an activity of allowing the Al—Si alloy to have a lower melting point and is thereby an essential composition for the brazing material. For this reason, the Si content in the Al—Si alloy is preferably 5% or more. The presence of Si in a content of 5% or more further ensures the brazing ability necessary for the heat exchanger, because Si also has an activity of improving flowability in addition to the activity of lowering the melting point. In contrast, Si, if present in an excessively large amount, may impair the workability and may impede the processing of the aluminum alloy clad material typically into a shape of a heat exchanger tube, thus being undesirable. For this reason, the Si content in the Al—Si alloy of the brazing material is preferably 15% or less. The Si content in the brazing material is more preferably from 8% to 12%. Exemplary Al—Si alloys having such compositions include the 4045 alloy, 4343 alloy, and 4004 alloy specified in Japanese Industrial Standards (JIS).

As used herein the term "Zn alloy" refers to a zinc (Zn) alloy containing Zn in a content of 60% or more; and the term "Sn alloy" refers to a tin (Sn) alloy containing Sn in a content of 60% or more. Exemplary Zn alloys and Sn alloys include S—Zn95A15 and S—Sn85Zn15 alloys prescribed in JIS Z3281 (Solders for Aluminum and Aluminum Alloys).

Sacrificial Material

As used herein the term "Al—Zn alloy" refers to an aluminum alloy containing Zn in a content of about 1% to about 10% and may be an aluminum alloy further containing Fe in a content of about 0% to about 1% and/or Mg in a content of about 0% to about 0.1%, in addition to Zn. Exemplary Al—Zn alloys include a JIS 7072 alloy.

The core material, brazing material, and sacrificial material in the clad material according to the present invention have been described above. The clad material according to the present invention preferably further includes an intermediate layer between the core material layer and the brazing material layer. When a fluoride flux is used in brazing, Mg and Ca in the core material may react with the fluoride in the flux to thereby lower the brazing ability. For solving this problem, it is effective to provide an intermediate layer having smaller Mg and Ca contents between the brazing material layer and the core material layer. The intermediate layer effectively exhibits its advantageous effect particularly when the core material contains Mg in a content of 0.5% to 1.0% and/or Ca in a content of 0.5% to 1.0%. In this case, the intermediate layer preferably has a Mg content of less than 0.5% and a Ca content of less than 0.5%. The upper limits of the Mg content and Ca content are each more preferably 0.4% or less, and furthermore preferably 0.3% or less. The intermediate layer may have a composition other than Mg and Ca as with the composition of the core material.

The clad material according to the present invention is preferably controlled in clad ratios (proportions of thicknesses of respective layers) and/or the thicknesses of the respective layers, so as to have satisfactory basic properties necessary as a heat exchanger tube or another member, such as corrosion resistance, strength, and brazing ability. For improving the brazing ability, the clad material preferably has a clad ratio of the brazing material layer (the ratio of the thickness of the brazing material layer to the total thickness of the clad material) of 5% or more and/or has a thickness of the brazing material layer of 20 µm or more. In contrast, an excessively thick brazing material layer is undesirable from the viewpoint of strength, and the clad material preferably has a clad ratio of the brazing material layer of 30% or less and/or has a thickness of the brazing material layer of 50 µm or less. When an intermediate layer is provided so as to inhibit the dispersion of Mg, Ca, and other elements adversely affecting the brazing ability, the clad material preferably has a clad ratio of the intermediate layer of 10% or more and/or has a thickness of the intermediate layer of 20 µm or more. In contrast, an excessively thick intermediate layer may cause insufficient strength, and the clad material preferably has a clad ratio of the intermediate layer of 50% or less and/or has a thickness of the intermediate layer of 100 μm or less.

Although not specifically limited, the aluminum alloy clad material according to the present invention can be manufactured, for example, by the following method. Initially, raw materials are melted and cast to yield ingots so as to have predetermined compositions for the core material and the brazing material respectively; the ingots are subjected, where necessary, to facing and homogenization treatment and thereby yield an ingot for the core material and an ingot for the brazing material. The respective ingots are hot-rolled to desired thicknesses or are mechanically sliced to desired thicknesses and thereby yield a core member, and a brazing member. When a sacrificial material layer and/or an intermediate layer is provided, a sacrificial member and an intermediate member are manufactured in the above manner.

Next, the brazing member is laid on one or both sides of the core member. In this process, when the sacrificial material layer is provided, the sacrificial member is laid on a side of the core member opposite to the brazing member. Where necessary, the intermediate member is laid between the core member and the brazing member. The resulting laminate is subjected to a heat treatment (reheating) and to compression bonding through hot rolling. The work is further subjected to cold rolling, process annealing, and another cold rolling. After the cold rolling, the work may be subjected to final annealing. The method may include any other process such as strain removing process between, before, and/or after the respective processes, within ranges not adversely affecting the processes.

EXAMPLES

The present invention will be illustrated in further detail with reference to several working examples below. It should be noted, however, that these examples are never intended to limit the scope of the present invention; various alternations and modifications may be made without departing from the scope and spirit of the present invention and are all included within the technical scope of the present invention.

Preparation of Specimens

Aluminum alloys for core materials having the chemical compositions given in Tables 1 to 3 were subjected to melting, ingot-making, and casting at a casting temperature of 700° C. through continuous casting to give ingots, and the ingots were homogenized at 530° C. for 6 hours or shorter, were hot-rolled, and thereby yielded core members.

TABLE 1

Composition of core material (percent by mass)
*the remainder being Al and inevitable impurities

| No. | Si | Mn | Cu | Ti | B | Mg | Ca | Ni | Cr | Nb | V | Zr |
|---|---|---|---|---|---|---|---|---|---|---|---|---|
| S1 | 0.49 | 0.80 | 0.23 | — | — | — | — | — | — | — | — | — |
| S2 | 0.50 | 0.80 | 0.52 | 0.004 | — | — | — | — | — | — | — | — |
| S3 | 0.50 | 0.79 | 0.50 | 0.15 | 0.0004 | — | — | — | — | — | — | — |
| S4 | 0.30 | 0.50 | 0.50 | 0.15 | 0.020 | — | — | — | — | — | — | — |
| S5 | 0.88 | 0.30 | 0.50 | 0.15 | 0.020 | — | — | — | — | — | — | — |
| S6 | 0.88 | 0.80 | 0.30 | 0.14 | 0.020 | — | — | — | — | — | — | — |
| S7 | 0.89 | 0.80 | 0.50 | 0.01 | 0.020 | — | — | — | — | — | — | — |
| S8 | 0.90 | 0.80 | 0.53 | 0.15 | 0.001 | — | — | — | — | — | — | — |
| S9 | 1.50 | 1.95 | 0.32 | 0.40 | 0.030 | — | — | — | — | — | — | — |
| S10 | 0.69 | 2.00 | 0.51 | 0.29 | 0.030 | — | — | — | — | — | — | — |
| S11 | 0.69 | 1.95 | 1.50 | 0.29 | 0.030 | — | — | — | — | — | — | — |
| S12 | 0.68 | 1.19 | 0.65 | 0.50 | 0.030 | — | — | — | — | — | — | — |
| S13 | 0.70 | 1.20 | 0.65 | 0.30 | 0.10 | — | — | — | — | — | — | — |
| S14 | 0.70 | 1.20 | 0.62 | 0.15 | 0.030 | 1.00 | — | — | — | — | — | — |
| S15 | 0.70 | 1.20 | 0.61 | 0.15 | 0.030 | — | 1.00 | — | — | — | — | — |
| S16 | 0.70 | 1.20 | 0.62 | 0.15 | 0.030 | 0.20 | 0.20 | — | — | — | — | — |

TABLE 2

Composition of core material (percent by mass)
*the remainder being Al and inevitable impurities

| No. | Si | Mn | Cu | Ti | B | Mg | Ca | Ni | Cr | Nb | V | Zr |
|---|---|---|---|---|---|---|---|---|---|---|---|---|
| S17 | 0.65 | 1.20 | 0.94 | 0.25 | 0.051 | — | — | 0.15 | — | — | — | — |
| S18 | 0.65 | 1.20 | 0.94 | 0.25 | 0.051 | — | — | — | 0.15 | — | — | — |
| S19 | 0.65 | 1.20 | 0.94 | 0.25 | 0.051 | — | — | — | — | 0.15 | — | — |
| S20 | 0.65 | 1.20 | 0.94 | 0.25 | 0.051 | — | — | 0.01 | 0.15 | — | — | — |
| S21 | 0.65 | 1.20 | 0.94 | 0.25 | 0.051 | — | — | — | 0.01 | 0.15 | — | — |
| S22 | 0.65 | 1.20 | 0.94 | 0.25 | 0.051 | — | — | — | 0.15 | — | 0.05 | — |
| S23 | 0.65 | 1.20 | 0.94 | 0.25 | 0.051 | — | — | — | 0.15 | — | — | 0.05 |
| S24 | 0.65 | 1.20 | 0.94 | 0.25 | 0.051 | — | — | 0.06 | 0.05 | 0.50 | — | — |
| S25 | 0.65 | 1.20 | 0.94 | 0.25 | 0.051 | — | — | 0.06 | 0.05 | — | 0.10 | — |
| S26 | 0.65 | 1.20 | 0.94 | 0.25 | 0.051 | — | — | 0.06 | 0.06 | 0.05 | — | 0.05 |
| S27 | 0.65 | 1.20 | 0.94 | 0.25 | 0.051 | — | — | 0.05 | 0.06 | 0.05 | 0.06 | — |
| S28 | 0.65 | 1.20 | 0.94 | 0.25 | 0.051 | — | — | 0.05 | 0.05 | 0.05 | 0.05 | 0.05 |

TABLE 3

Composition of core material (percent by mass)
*the remainder being Al and inevitable impurities

| No. | Si | Mn | Cu | Ti | B | Mg | Ca | Ni | Cr | Nb | V | Zr |
|---|---|---|---|---|---|---|---|---|---|---|---|---|
| S29 | 0.60 | 1.50 | 0.61 | 0.20 | 0.030 | 0.60 | — | — | 0.15 | — | — | — |
| S30 | 0.60 | 1.50 | 0.61 | 0.20 | 0.030 | — | 0.59 | — | — | — | 0.50 | — |
| S31 | 0.60 | 1.50 | 0.61 | 0.20 | 0.030 | 0.01 | 0.60 | — | — | — | — | 0.50 |
| S32 | 0.60 | 1.50 | 0.61 | 0.20 | 0.030 | 0.60 | — | 0.50 | 0.05 | — | — | — |
| S33 | 0.60 | 1.50 | 0.61 | 0.20 | 0.030 | 0.60 | — | 0.20 | — | 0.01 | — | — |
| S34 | 0.60 | 1.50 | 0.61 | 0.20 | 0.030 | 0.30 | — | 0.10 | — | — | 0.10 | — |
| S35 | 0.60 | 1.50 | 0.61 | 0.20 | 0.030 | — | 0.30 | — | 0.10 | 0.10 | — | — |
| S36 | 0.60 | 1.50 | 0.61 | 0.20 | 0.030 | 0.61 | 0.60 | — | 0.10 | — | — | 0.10 |
| S37 | 0.60 | 1.50 | 0.61 | 0.20 | 0.030 | 0.61 | — | 0.05 | 0.50 | 0.05 | — | — |
| S38 | 0.60 | 1.50 | 0.61 | 0.20 | 0.030 | 0.61 | — | 0.10 | 0.10 | — | — | 0.10 |
| S39 | 0.60 | 1.50 | 0.61 | 0.20 | 0.030 | 0.60 | — | — | 0.10 | 0.11 | 0.05 | 0.05 |
| S40 | 0.60 | 1.50 | 0.61 | 0.20 | 0.030 | — | 0.01 | 0.10 | — | 0.11 | 0.05 | 0.05 |
| S41 | 0.60 | 1.50 | 0.61 | 0.20 | 0.030 | 0.55 | 0.58 | 0.05 | 0.05 | 0.10 | 0.01 | 0.11 |
| S42 | 0.60 | 1.50 | 0.61 | 0.20 | 0.030 | 0.20 | 0.20 | 0.10 | 0.10 | 0.05 | 0.05 | 0.01 |

As the brazing material, a brazing member was prepared by melting and casting an Al-10% Si alloy corresponding to JIS 4045 standard to give an ingot, homogenizing the ingot at 500° C. for 3 hours, and hot-rolling the homogenized ingot.

The brazing member was laid on one side of the core member, the resulting laminate was subjected to hot-rolling at 400° C. to 550° C., then subjected to cold rolling, process annealing, and another cold rolling, and thereby yielded clad materials having a final gage of 0.25 mm. The structures or configurations of the clad materials are as shown in Tables 4 to 6.

When a brazing technique is adopted to the manufacture of a heat exchanger, added elements diffuse due to thermal diffusion during heating for brazing. As a result, the resulting heat exchanger suffers concentration gradients of the added elements. For example, Si diffuses from the brazing material layer having a relatively large Si content to the core material layer or intermediate layer having a relatively small Si content. For simulating the thermal diffusion of added elements upon heating for brazing, the above-prepared clad materials were subjected to a heating treatment at 600° C. for 5 minutes, which conditions corresponding to the brazing, and thereby yielded specimens for corrosion test. Specifically, specimens for corrosion test 60 mm long and 50 mm wide were cut from the aluminum alloy clad materials after the heating treatment. The cut specimens were washed with acetone, and, while defining a test surface as an area 50 mm long and 40 mm wide of the core material layer surface, the surfaces of the specimens other than the test surface, i.e., the outer periphery 5 mm wide of the surface of the core material, the entire side surfaces, and the entire surface of the brazing material layer were covered with a silicone sealant.

Corrosion Test

To evaluate corrosion properties in an environment simulating the inner surface of a radiator, the above-prepared specimens were immersed in a solution simulating the cooling water, and whether and how the specimens underwent corrosion were determined. The solution used herein was an OY water containing 195 ppm by mass of $Cl^-$, 60 ppm by mass of $SO_4^{2-}$, 1 ppm by mass of $Cu^{2+}$, and 30 ppm by mass of $Fe^{3+}$ and having a pH of 3.0. The solution in which each specimen was immersed was subjected to temperature cycles for one month, each one cycle per one day. In one cycle, the solution was heated from room temperature to 88° C. over 1 hour, held at 88° C. for 7 hours, and cooled to room temperature over 1 hour, and held at room temperature for 15 hours. In the corrosion test in this experimental example, each five specimens were tested per each of the aluminum alloy clad material samples in Tables 4 to 6, and depth of local corrosion in the test surface (core material surface) after the corrosion test was measured. The local corrosion depths of the five specimens of each aluminum alloy clad material sample were measured according to the focal depth method, and of the measured five local corrosion depths, the deepest local corrosion depth was defined as the maximum corrosion depth of the sample in question. The specimens after the corrosion test were immersed in nitric acid to remove corrosion products before the measurements of the local corrosion depths. The results are shown in Tables 4 to 6.

TABLE 4

| | Core material layer | | Brazing material layer | | Corrosion test result Maximum | |
|---|---|---|---|---|---|---|
| No. | Material | Thickness (μm) | Material | Thickness (μm) | corrosion depth (μm) | Overall judgement |
| 1 | S1 | 210 | 4045 | 40 | penetrating | Failure |
| 2 | S2 | 210 | 4045 | 40 | penetrating | Failure |
| 3 | S3 | 210 | 4045 | 40 | penetrating | Failure |
| 4 | S4 | 210 | 4045 | 40 | 103 | Fair |
| 5 | S5 | 210 | 4045 | 40 | 105 | Fair |
| 6 | S6 | 210 | 4045 | 40 | 102 | Fair |
| 7 | S7 | 210 | 4045 | 40 | 103 | Fair |
| 8 | S8 | 210 | 4045 | 40 | 101 | Fair |
| 9 | S9 | 210 | 4045 | 40 | 104 | Fair |
| 10 | S10 | 210 | 4045 | 40 | 102 | Fair |
| 11 | S11 | 230 | 4045 | 20 | 105 | Fair |
| 12 | S12 | 230 | 4045 | 20 | 102 | Fair |
| 13 | S13 | 230 | 4045 | 20 | 100 | Fair |
| 14 | S14 | 200 | 4045 | 50 | 82 | Fair or Good |
| 15 | S15 | 200 | 4045 | 50 | 80 | Fair or Good |
| 16 | S16 | 200 | 4045 | 50 | 79 | Fair or Good |

TABLE 5

| | Core material layer | | Brazing material layer | | Corrosion test result Maximum | |
|---|---|---|---|---|---|---|
| No. | Material | Thickness (μm) | Material | Thickness (μm) | corrosion depth (μm) | Overall judgement |
| 17 | S17 | 215 | 4045 | 35 | 65 | Good |
| 18 | S18 | 215 | 4045 | 35 | 64 | Good |
| 19 | S19 | 215 | 4045 | 35 | 68 | Good |
| 20 | S20 | 215 | 4045 | 35 | 62 | Good |

TABLE 5-continued

| No. | Core material layer Material | Thickness (μm) | Brazing material layer Material | Thickness (μm) | Corrosion test result Maximum corrosion depth (μm) | Overall judgement |
|---|---|---|---|---|---|---|
| 21 | S21 | 215 | 4045 | 35 | 62 | Good |
| 22 | S22 | 215 | 4045 | 35 | 62 | Good |
| 23 | S23 | 215 | 4045 | 35 | 64 | Good |
| 24 | S24 | 215 | 4045 | 35 | 64 | Good |
| 25 | S25 | 215 | 4045 | 35 | 64 | Good |
| 26 | S26 | 215 | 4045 | 35 | 62 | Good |
| 27 | S27 | 215 | 4045 | 35 | 62 | Good |
| 28 | S28 | 215 | 4045 | 35 | 63 | Good |

TABLE 6

| No. | Core material layer Material | Thickness (μm) | Brazing material layer Material | Thickness (μm) | Corrosion test result Maximum corrosion depth (μm) | Overall judgement |
|---|---|---|---|---|---|---|
| 29 | S29 | 205 | 4045 | 45 | 40 | Excellent |
| 30 | S30 | 205 | 4045 | 45 | 39 | Excellent |
| 31 | S31 | 205 | 4045 | 45 | 40 | Excellent |
| 32 | S32 | 205 | 4045 | 45 | 39 | Excellent |
| 33 | S33 | 205 | 4045 | 45 | 40 | Excellent |
| 34 | S34 | 205 | 4045 | 45 | 41 | Excellent |
| 35 | S35 | 205 | 4045 | 45 | 41 | Excellent |
| 36 | S36 | 205 | 4045 | 45 | 41 | Excellent |
| 37 | S37 | 205 | 4045 | 45 | 40 | Excellent |
| 38 | S38 | 205 | 4045 | 45 | 35 | Excellent |
| 39 | S39 | 205 | 4045 | 45 | 36 | Excellent |
| 40 | S40 | 205 | 4045 | 45 | 37 | Excellent |
| 41 | S41 | 205 | 4045 | 45 | 34 | Excellent |
| 42 | S42 | 205 | 4045 | 45 | 36 | Excellent |

Samples Nos. 1, 2, and 3 were samples having a Cu content, a Ti content, and a B content, respectively, in the core material of less than the ranges specified in the present invention, thereby showing insufficient corrosion resistance, and suffering from penetration of pits through the clad materials caused by local corrosion.

In contrast, Samples Nos. 4 to 42 had appropriately controlled Cu, Ti, and B contents in the core material and showed improved resistance to local corrosion. Among them, Samples Nos. 14 to 16 further contained Mg and/or Ca in addition to Cu, Ti, and B, and Samples Nos. 17 to 28 further contained at least one element selected from Ni, Cr, Nb, V, and Zr in addition to Cu, Ti, and B, and these samples showed further improved resistance to local corrosion. Samples Nos. 29 to 42 contained Mg and/or Ca in combination with at least one element selected from Ni, Cr, Nb, V, and Zr, in addition to Cu, Ti, and B, thereby showed very small maximum corrosion depths of less than 50 μm and exhibited very excellent resistance to local corrosion.

The invention claimed is:

1. An aluminum alloy clad material comprising:
   a layer of the core material; and
   a filler material layer clad on one or both sides of the core material layer,
   wherein the filler material contains an Al—Si alloy, a Zn alloy, or a Sn alloy, and
   wherein the core material consists of:
   silicon (Si) in a content of 0.3 to 1.5 percent by mass,
   manganese (Mn) in a content of 0.3 to 2.0 percent by mass,
   copper (Cu) in a content of 0.3 to 1.5 percent by mass,
   titanium (Ti) in a content of 0.01 to 0.5 percent by mass,
   boron (B) in a content of 0.001 to 0.1 percent by mass, and
   calcium (Ca) in a content of 1.0 percent by mass or less (excluding 0%)
   with the remainder including aluminum (Al) and inevitable impurities.

2. An automobile heat exchanger comprising the aluminum alloy clad material according to claim 1.

3. An automobile brazed radiator tube comprising the aluminum alloy clad material as clamed in claim 1.

4. An aluminum alloy clad material comprising
   a layer of the core material;
   a filler material layer clad on one side of the core material layer; and
   a sacrificial material layer clad on the other side of the core material layer,
   wherein the filler material contains an Al—Si alloy, a Zn alloy, or a Sn alloy, and
   wherein the sacrificial material contains an Al—Zn alloy, and
   wherein the core material consists of:
   silicon (Si) in a content of 0.3 to 1.5 percent by mass,
   manganese (Mn) in a content of 0.3 to 2.0 percent by mass,
   copper (Cu) in a content of 0.3 to 1.5 percent by mass,
   titanium (Ti) in a content of 0.01 to 0.5 percent by mass,
   boron (B) in a content of 0.001 to 0.1 percent by mass, and
   calcium (Ca) in a content of 1.0 percent by mass or less (excluding 0%)
   with the remainder including aluminum (Al) and inevitable impurities.

5. An automobile heat exchanger comprising the aluminum alloy clad material according to claim 4.

6. An automobile brazed radiator tube comprising the aluminum alloy clad material as clamed in claim 4.

* * * * *